United States Patent [19]

Kistler

[11] Patent Number: 5,650,005
[45] Date of Patent: Jul. 22, 1997

[54] PROCESS FOR HIGH FREE LIME CONTENT IN CEMENT CLINKER

[75] Inventor: George Chris Kistler, Eldridge, Iowa

[73] Assignee: Lafarge Canada Inc., Montreal, Canada

[21] Appl. No.: 654,841

[22] Filed: May 29, 1996

[51] Int. Cl.⁶ .................. C04B 2/10; C04B 7/43; C04B 7/47; C04B 7/48
[52] U.S. Cl. .................. 106/748; 106/710; 106/738; 106/743; 106/750; 106/792
[58] Field of Search .................. 106/739, 748, 106/771, 792, 738, 743, 750, 710

[56] References Cited

U.S. PATENT DOCUMENTS

| | | | |
|---|---|---|---|
| 3,884,710 | 5/1975 | Allen et al. | 106/792 |
| 3,998,649 | 12/1976 | Gottlieb | 106/771 |
| 4,102,700 | 7/1978 | Kwech et al. | |
| 4,504,319 | 3/1985 | Wolter et al. | 106/771 |

*Primary Examiner*—Michael Marcheschi
*Attorney, Agent, or Firm*—Bachman & LaPointe, P.C.

[57] ABSTRACT

A source of free lime is introduced into a cooling zone of a cement kiln in an amount to elevate the free lime content to a content of 0.6 to 2.0%, by weight. This addition is made without altering the normal or standard process operating parameters of the kiln for cement clinker production. The free lime content of 0.6 to 2.0%, by weight, provides advantageous characteristics in cement produced with the cement clinker.

21 Claims, 2 Drawing Sheets

PROCESS FOR HIGH FREE LIME CONTENT IN CEMENT CLINKER

BACKGROUND OF THE INVENTION i) Field of the Invention

The invention relates to a process for control of the free lime content of cement clinker, more especially for elevating the normal free lime content of cement clinker.

ii) Description of Prior Art

In the production of Portland cements, the raw ingredients pass through different heating stages in a rotary kiln. In the kiln the ingredients pass through a calcining zone in which calcium carbonate is thermally decomposed to lime; the calcining zone is typically at a temperature of 825° C. to 1000° C. Thereafter the calcined material enters a burning zone which is at a temperature typically of 1375° to 1450° C.; the chemical reactions which form the cement clinker take place in the burning zone.

The formed cement clinker passes through an initial cooling zone downstream of the burning zone and thence into a cooler where the temperature profile gradually drops.

The free lime content of cement clinker can more or less be controlled in the production of the cement clinker, but varies from installation to installation and as between different types of installation, for example, precalciner process kilns and wet process kilns. In some operations the cement clinker produced has a free lime content of less than 0.5%, by weight.

In general, while it was known previously that cement clinker produced by some conventional processes had a free lime content often as low as about 0.25%, this was not a problem because the strength was satisfactory. Furthermore, the process operating parameters in the manufacture of cement clinker, for a particular rotary kiln, are fairly rigidly controlled and variations in such parameters are generally avoided. Altering the ratio of the components of the raw ingredients, or process parameters such as the temperature of the different zones, or the rate of flow through the kiln, which affects the holding time of the materials in each zone, disturbs the desired clinker formation.

Thus, in general, the process operating parameters in cement clinker manufacture, for a given kiln, are well established, are carefully controlled to ensure the desired chemical reactions for the production of a clinker of desired characteristics, and there is strong resistance to altering these parameters for any reason, because such alteration affects the clinker production and the characteristics of the clinker adversely.

Thus even though there is a desire to control the free lime content of cement clinker to a particular level, persons in the art would not have considered altering the established process parameters for clinker production in a particular kiln since such alterations could affect the stability of the operation.

SUMMARY OF THE INVENTION

It has now been found that a free lime content in the cement clinker, higher than that which can be controlled with stable kiln operation, provides advantages with respect to the setting time and control of the setting time in the cement produced with the clinker.

It is thus an object of this invention to provide a process whereby a desired free lime content is developed in a cement clinker without modifying the process operating parameters for cement clinker in a rotary kiln.

In accordance with one aspect of the invention there is provided a process for producing a cement clinker of elevated free lime content comprising: a) feeding cement clinker ingredients into a cement kiln, b) subjecting said cement clinker raw ingredients to clinker production process stages to produce a cement clinker of a first free lime content, c) cooling said cement clinker, and d) recovering the cooled cement clinker, and including a step of: e) feeding a source of lime into said cement clinker downstream of the formation of the cement clinker and upstream of the recovery of the cooled clinker, in an amount to elevate the free lime content of the clinker from said first content to a second content higher than said first content.

In accordance with another aspect of the invention there is provided a process for producing a cement clinker comprising: i) feeding cement clinker raw ingredients into a cement kiln, ii) subjecting said cement clinker raw ingredients to conventional clinker production stages under conventional process operating parameters for said kiln, to produce cement clinker, iii) cooling said cement clinker, and iv) recovering the cooled cement clinker and including a step of v) determining the free lime content of the cement clinker produced under said conventional process operating parameters of said kiln, and without altering said process operating parameters, feeding a source of lime into said cement clinker downstream of the formation of the cement clinker and upstream of the recovery of the cooled clinker, in an amount effective to elevate the free lime content of the cement clinker, to an amount ranging from 0.6 to 2.0%, by weight, based on the weight of cement clinker.

DETAILED DESCRIPTION OF THE INVENTION i) Free Lime Content

It has been found that especially advantageous characteristics are obtained if the free lime content of cement clinker is in the range of about 0.6 to 2.0%, and preferably about 1.0 to about 1.5%, by weight, based on the weight of the clinker.

The free lime content of cement clinker produced by some conventional processes in a rotary kiln is significantly less than 0.6%, by weight, and can be less than 0.3%, by weight.

ii) Process Operating Parameters

The process operating parameters for a cement kiln are usually well established and carefully controlled- Modifying these parameters results in changes in the extent of chemical reactions, and in the nature of the chemical reaction, such that such modification can produce undesired changes in the product cement clinker and instability in the kiln operation.

In the present invention it has been found that a free lime content can have positive advantages, especially if such content falls within the range of 0.6 to 2.0%, by weight, and preferably 1.0 to 1.5%, by weight.

Theoretically, the raw ingredients for cement clinker production or other operating parameters of the clinker production might be modified to elevate the free lime content. Unfortunately, as indicated hereinbefore, such modifications can bring with them undesired changes in the clinker.

In the present invention the conventional process operating parameters of the rotary kiln, for cement clinker production, are not altered.

In the process the raw cement clinker ingredients are fed into the cement kiln and pass successively through a calcining zone and a burning zone.

In a long kiln employing a wet process the ingredients pass through a drying zone upstream of the calcining zone;

in the drying zone the ingredients are heated to a temperature which typically is 300° to 800° C.; in this zone both free and chemically bound water are driven from the ingredients, and some thermal decomposition reactions may commence, for example, decomposition of magnesium carbonate.

In other processes ingredients, in a dry state are fed to the calcining zone from a preheater or precalciner. The preheater may employ a plurality of cyclones through which the ingredients heated by hot exhaust gases from the kiln, are fed. The precalciner produces partial calcining of the ingredients before they enter the kiln.

The invention may be employed in these different processes including the long dry process, the wet process, the preheater process and the precalciner process.

In the calcining zone, calcium carbonate in the ingredients is thermally decomposed to lime (calcium oxide). The temperature in the calcining zone is typically 825° to 1000° C.

In the burning zone, chemical reactions occur which form the cement clinker; the temperature in the burning zone is typically 1375° to 1450° C. In these chemical reactions the lime and clay oxides chemically combine, and alkali, sulfur and halides are vaporized.

In the burning zone a phase equilibria occurs, a liquid content of 20–30%, by weight, forms and chemical reactions occur at the interface of solid and liquid surfaces. Crystalline silicate phases are formed which are separated by interstitial liquid.

The Portland Cement zone of the equilibrium ternary system, $CaO-Al_2O_3-SiO_2$ is relatively small and a high content of reacted lime has been favoured, in part by the conventional desire to maintain the uncombined lime at a low level.

The formed cement clinker passes from the burning zone to a cooling zone. The cooling zone typically may comprise an upstream cooling zone within the kiln between the burning zone and the kiln outlet; and a downstream cooling zone in a cooler downstream of the kiln outlet.

In the upstream cooling zone, initial cooling of the clinker commences: the upstream cooling zone is typically at a temperature of about 1300° to 1400° C.

In the downstream cooling zone the temperature profile gradually drops from an inlet temperature from the upstream cooling zone down to 65° to 200° C.

The cement kiln in which the process of the invention is carried out may be any conventionally employed rotary cement kiln. However, the invention may be exploited to particular advantage in a long kiln, in either a dry or wet process, where kiln operating parameters are especially critical in maintaining process stability.

iii) Increasing Free Lime Content

In the process of the invention a source of lime is added to the formed cement clinker in the cooling zone. The preferred source of lime is limestone or calcium carbonate. The temperature in the upstream cooling zone and in the inlet of the downstream cooling zone is sufficiently high for thermal decomposition of a source of lime, such as calcium carbonate, to lime.

Other sources of lime, including lime itself, calcium bicarbonate, marl, marble and aragonite may also be employed.

Adding the source of lime to the cooling zone downstream of the burning zone where the clinker formation takes place, does not affect the clinker production, since the flow of solids and gases in the cooling zone, into which the source of lime is introduced, is away from the burning zone.

The free lime content of cement clinker produced under conventional process operating parameters for a particular kiln, is readily determined, as will be understood by persons in the art.

In particular the free lime content of cement clinker may be determined in accordance with ASTM C114, Section 27. Free Calcium Oxide, described in the 1994 Annual Book of ASTM Standards, Section 4, Construction, Volume 04.01 Cement; Lime; Gypsum, pages 112–113. There are two test methods available under this standard, one being a modified Franke procedure in which uncombined lime is titrated with dilute perchloric acid after solution in an ethylacetoacetate-isobutyl alcohol solvent; the other being an ammonium acetate titration of the alcohol-glycerin solution of uncombined lime with $Sr(No_3)_2$ as an accelerator.

Based on this known content of free lime, for a given kiln, operating under given process parameters, the amount of the source of lime to be added to the cooling zone to produce a required increase to a content of free lime of 0.6 to 2.0%, by weight, preferably 1.0 to 1.5%, by weight, can be readily determined.

DESCRIPTION OF PREFERRED
EMBODIMENTS WITH REFERENCE TO THE
DRAWINGS

Figure 1:
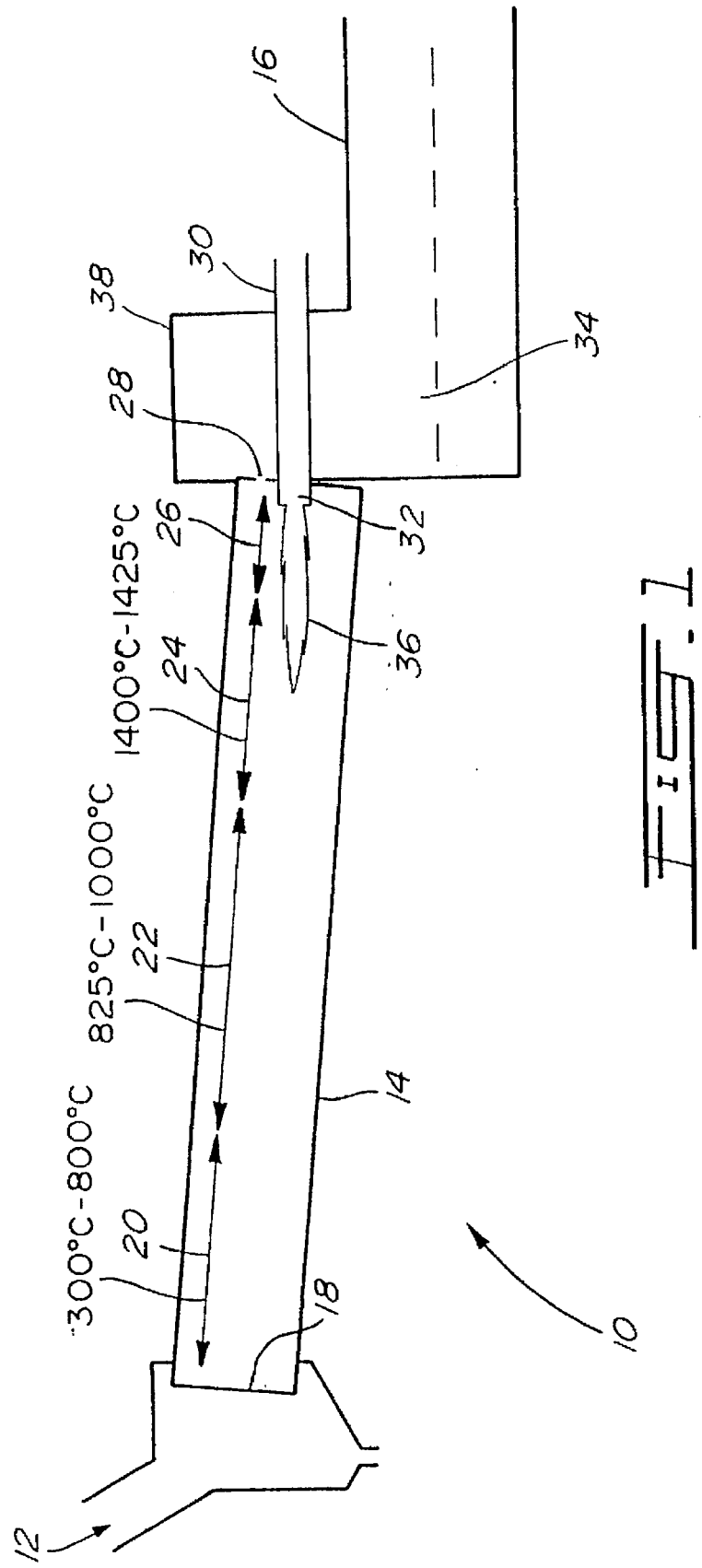
FIG. 1 is a schematic illustration of a generic long kiln for producing cement clinker with the possible sites of introduction of the source of lime, in accordance with the invention, identified.

With further reference to FIG. 1, a kiln assembly 10 includes a feed inlet 12, a long rotary kiln 14 and a cooler 16.

The kiln 14 is mounted for rotation relative to feed inlet 12 and cooler 16.

Rotary kiln 14 has a drying zone 20, for use in a wet process, a calcining zone 22, a burning zone 24 and an initial cooling zone 26.

Rotary kiln 14 extends between a feed port 18 and a clinker outlet 28.

A burner assembly 30 mounted externally of kiln 14 has a burner nozzle 32 mounted in a firing hood 38, which nozzle 32 extends through outlet 28 into kiln 14. A flame 36 is developed at nozzle 32.

Cooler 16 has a cooling zone 34, the clinker at the upstream end is at about 1300° C.

In operation raw cement clinker ingredients in particulate form are fed through inlet 12 and feed port 18 into the kiln 14, where they first enter drying zone 20. The kiln 14 rotates slowly, and is inclined downwardly from port 18 to outlet 28. With rotation of kiln 14, the ingredients advance slowly and sequentially through drying zone 20, calcining zone 22 and burning zone 24; into which a flame extends from burner nozzle 32.

Clinker formation is completed in burning zone 24.

In the stages up to and including the burning zone 24 the kiln 14 is operated with its conventional process parameters for clinker production.

The drying zone 20 typically employs mobile chains and hot gas flow in counter flow to the raw ingredients. The formed clinker passes from cooler 16 to storage, optionally via a grinding stage.

A source of lime is introduced either into cooling zone 26 or into cooling zone 34, as indicated by the arrows. If the source of lime is introduced into cooling zone 34, account most be taken of any temperature requirement for liberation of lime from the source. In general, in the case of zone 34, the source would be introduced at an upstream end of zone 34, where the temperature is higher.

The amount of the source of lime added is calculated based on the known free lime content of the cement clinker produced in the kiln under the conventional process operating parameters, to elevate the free lime content to an amount of 0.6 to 1.5%, by weight.

Figure 2:
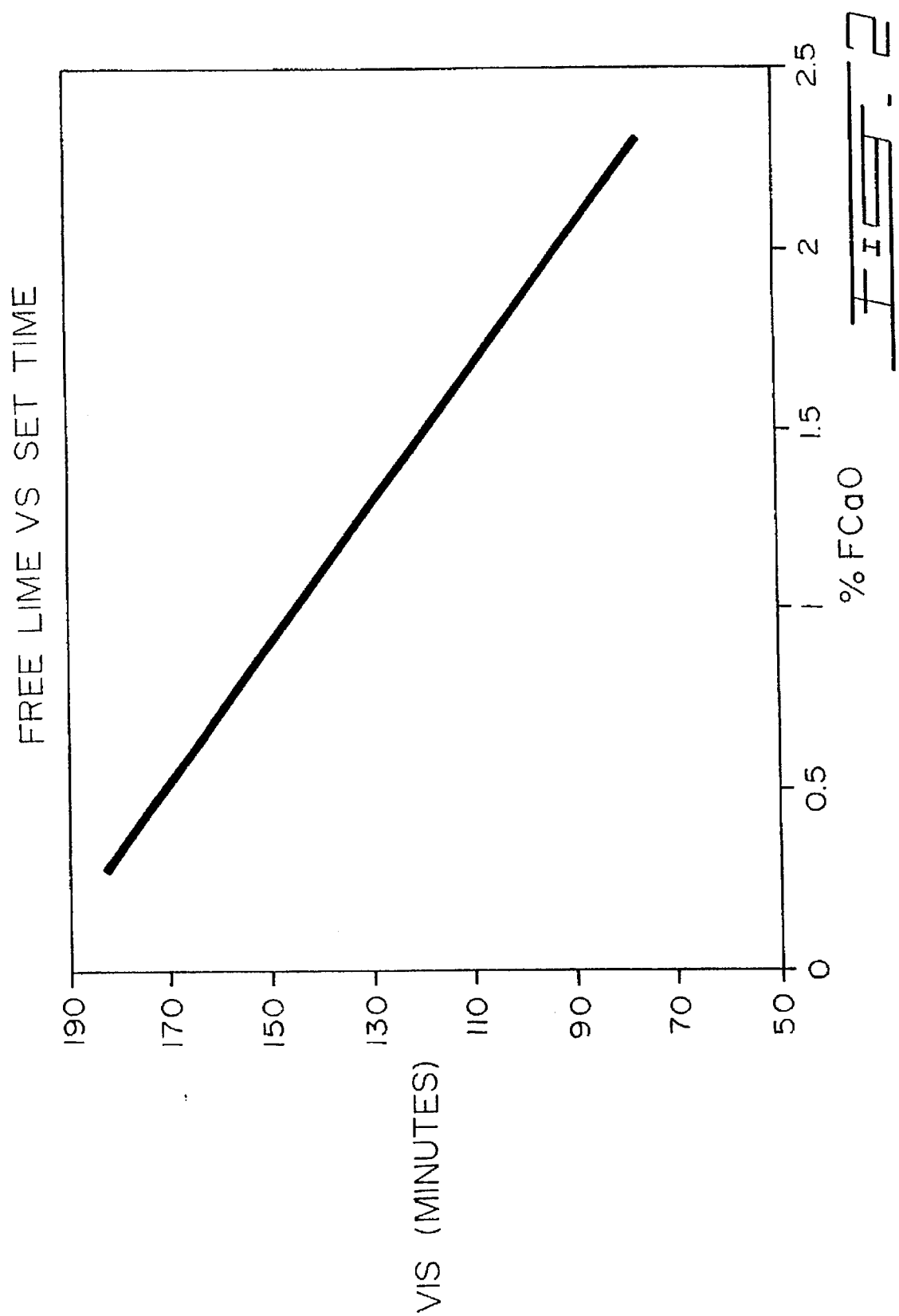
FIG. 2 illustrates graphically the relationship between free lime content of cement clinker and set time for the cement based on the clinker.

With further reference to FIG. 2, there are shown plots for cements from two different rotary kiln sources in which the free lime content was varied. The VIS setting time was determined by Vicat needle in accordance with ASTM C-191-92, Time of Setting of Hydraulic Cement Mortar by Modified Vicat Needle, published in 1995 Annual Book of ASTM Standards, Section 4—Construction, Vol. 04.01 Cement; Lime; Gypsum, pages 158–160.

These plots show a direct correlation between the free lime content and the setting time.

I claim:

1. A process for producing a cement clinker of elevated free lime content comprising:
   a) feeding cement clinker raw ingredients into a cement kiln,
   b) subjecting said cement clinker raw ingredients to clinker production process stages to produce a cement clinker of a first free lime content,
   c) cooling said cement clinker, and
   d) recovering the cooled cement clinker, and including a step of:
   e) subsequent to subjecting said cement clinker raw ingredients to clinker production process stages, determining the free lime content of the cement clinker and feeding a source of lime into said cement clinker downstream of the production of the cement clinker and upstream of the recovery of the cooled clinker, in an amount to elevate the free lime content of the clinker from said first content to a second content higher than said first content.

2. A process according to claim 1, wherein said second content is 0.6 to 2.0%, by weight, of said clinker and said first content is less than 0.5%, by weight, of said clinker.

3. A process according to claim 1, wherein step b) comprises feeding said ingredients, sequentially, through a calcining zone and a burning zone and said cooling in step c) is carried out in a cooling zone, and said source of lime is fed into said cement clinker in said cooling zone.

4. A process according to claim 3, wherein said cooling zone comprises an upstream, initial cooling zone within said kiln, downstream of said burning zone; and a downstream cooling zone in a cooler, and said source of lime is fed into said upstream initial cooling zone.

5. A process according to claim 3, wherein said cooling zone comprises an upstream, initial cooling zone within said kiln, downstream of said burning zone; and a downstream cooling zone in a cooler, and said source of lime is fed into said downstream cooling zone.

6. A process according to claim 4, wherein said source of lime is limestone.

7. A process according to claim 5, wherein said source of lime is limestone.

8. A process according to claim 4, wherein said second content is 1.0 to 1.5%, by weight, of said clinker and said first content is less than 0.5%, by weight, of said clinker.

9. A process according to claim 5, wherein said second content is 1.0 to 1.5%, by weight, of said clinker and said first content is less than 0.5%, by weight, of said clinker.

10. A process for producing a cement clinker comprising:
    i) feeding cement clinker raw ingredients into a cement kiln,
    ii) subjecting said cement clinker raw ingredients to conventional clinker production stages under conventional process operating parameters for said kiln, to produce cement clinker,
    iii) cooling said cement clinker, and
    iv) recovering the cooled cement clinker; and including a step of:
    v) subsequent to subjecting said cement clinker raw ingredients to clinker production process stages, determining a free lime content of the cement clinker produced under said conventional process operating parameters of said kiln, and without altering said process parameters, feeding a source of lime into said cement clinker downstream of the production of the cement clinker and upstream of the recovery of the cooled clinker, in an amount effective to elevate the free lime content of the cement clinker, to an amount ranging from 0.6 to 2.0%, by weight, based on the weight of cement clinker.

11. A process according to claim 10, wherein step ii) comprises feeding said ingredients, sequentially, through a preheating zone, a calcining zone and a burning zone and said cooling in step iii) is carried out in a cooling zone, and said source of lime is fed into said cement clinker in said cooling zone.

12. A process according to claim 11, wherein said cooling zone comprises an upstream, initial cooling zone within said kiln, downstream of said burning zone; and a downstream cooling zone in a cooler, and said source of lime is fed into said upstream initial cooling zone.

13. A process according to claim 11, wherein said cooling zone comprises an upstream, initial cooling zone within said kiln, downstream of said burning zone; and a downstream cooling zone in a cooler, and said source of lime is fed into said downstream cooling zone.

14. A process according to claim 12, wherein said free lime content is elevated to an amount of 1.0 to 1.5%, by weight, based on the weight of cement clinker, in step v).

15. A process according to claim 11, wherein said free lime content is elevated to an amount of 1.0 to 1.5%, by weight, based on the weight of cement clinker, in step v).

16. A process according to claim 14, wherein the free lime content, prior to elevation, determined in step v) is less than 0.5%, by weight, of said clinker.

17. A process according to claim 15, wherein the free lime content, prior to elevation, determined in step v) is less than 0.3%, by weight, of said clinker.

18. A process according to claim 10, wherein said source of lime is limestone.

19. A process according to claim 12, wherein said source of lime is limestone.

20. A process according to claim 13, wherein said source of lime is limestone.

21. A process according to claim 10, wherein in step v) the free lime content is determined in accordance with ASTM C114, Section 27.

* * * * *